R. DUTCHER.
COTTON PLANTER.
APPLICATION FILED JUNE 23, 1917.
1,265,439.
Patented May 7, 1918.
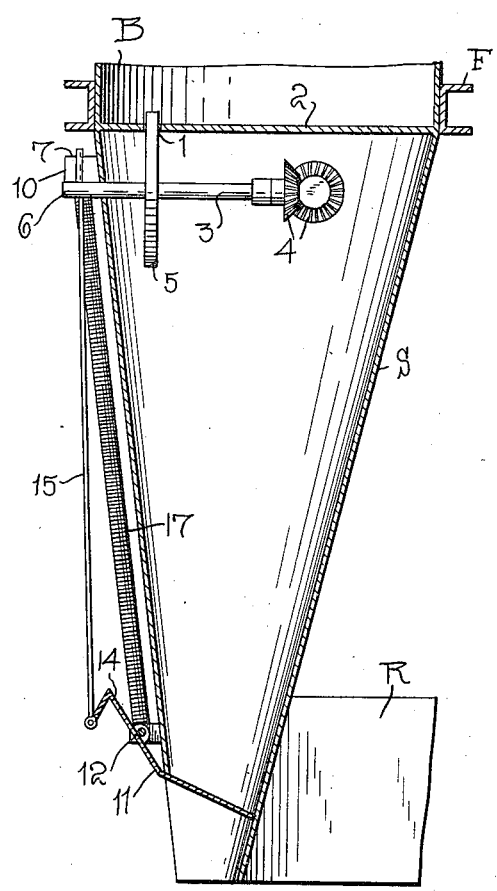
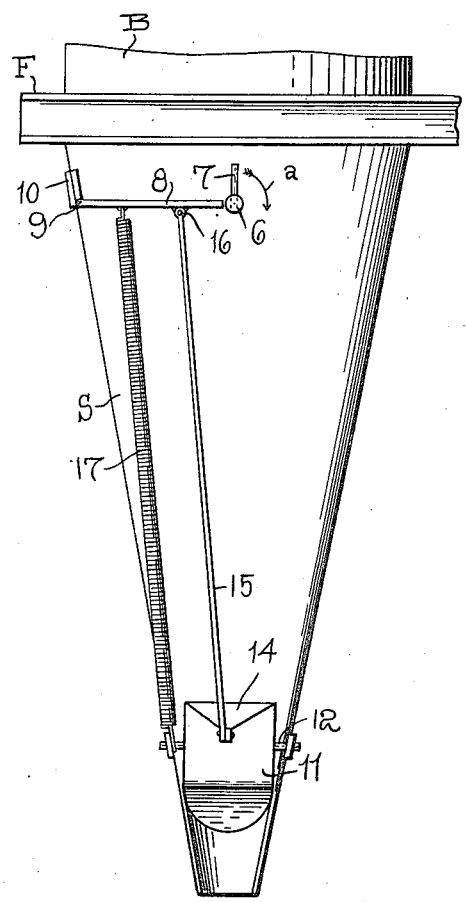
Inventor
ROBERT DUTCHER
By Watson E. Coleman
Attorney

UNITED STATES PATENT OFFICE.

ROBERT DUTCHER, OF ANADARKO, OKLAHOMA.

COTTON-PLANTER.

1,265,439.

Specification of Letters Patent.

Patented May 7, 1918.

Application filed June 23, 1917. Serial No. 176,618.

*To all whom it may concern:*

Be it known that ROBERT DUTCHER, a citizen of the United States, residing at Anadarko, in the county of Caddo and State of Oklahoma, has invented certain new and useful Improvements in Cotton-Planters, of which the following is a specification, reference being had to the accompanying drawings.

This invention relates to certain improvements in cotton planters and it is an object of the invention to provide a device of this general character wherein the seeds are discharged from the spout at predetermined intervals so that the necessity of chopping is eliminated.

It is also an object of the invention to provide a novel and improved device of this general character wherein a spout is employed in communication with a seed box together with the feeding means carried by the spout and extending within the seed box and wherein said feeding means is caused to intermittently throw into position a valve co-acting with the lower or discharge end of the spout.

The invention consists in the details of construction and in the combination and arrangement of the several parts of my improved cotton planter wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings wherein—

Figure 1 is a fragmentary view partly in section and partly in elevation illustrating a planter constructed in accordance with an embodiment of my invention; and Fig. 2 is a fragmentary view in rear elevation of the device as herein embodied.

As disclosed in the accompanying drawings F denotes a portion of the frame adapted to be supported in any desired manner. Mounted upon the frame F is a seed box B from which depends a spout S, said spout being in communication with the box B through the slot 1 produced in the bottom 2 of the box B. Rotatably supported by the spout S and positioned therein is a substantially horizontally disposed shaft 3 adapted to be driven in a conventional manner as indicated at 4. Fixed to the shaft 3 is a feed wheel 5 extending through the slot 1 and which serves to assure the desired feed of the seed from the box B to the spout S. One end portion 6 of the shaft 3 extends exteriorly of the spout S and said extended portion 6 has radiating therefrom the trip or finger 7 which is adapted to engage the inner or free end portion of the arm 8. The outer end portion of the arm 8 is pivotally engaged as at 9 with a bracket 10 secured to and extending laterally from the spout S.

Co-acting with the lower or discharge end of the spout S is a swinging valve or closure member 11 pivotally engaged as at 12 with the spout S. The valve or plate 11 is provided with a tail piece 14 substantially in the form of an inverted V and pivotally engaged with the free end of said tail piece 14 is a rod 15 which has its upper or opposite end portion pivotally engaged as at 16 with the arm 8 at a predetermined point inwardly of the inner or free end of said arm 8. It will be self evident that as the shaft 6 is rotated in the direction as indicated by the arrow (*a*) in Fig. 2 the trip or pin 7 will engage the inner or free end portion of the arm 8 from below and force the same upwardly which results in the valve or plate 11 being adjusted or swung into an open position so that the seed therein may be discharged therefrom. The valve or plate 11 is automatically returned to a closed position through the medium of the retractile member 17 interposed between the arm 8 and the pintle 12, said retractile member being herein disclosed as a conventional coil spring. With my improved planter the seed will be discharged from the spout S in predetermined intervals whereby the necessity of chopping is eliminated and which results in a material reduction in the cost of production both in labor and the cost of the seeds. R denotes a fragmentary portion of a runner co-acting with the lower or discharge end of the spout S.

From the foregoing description, it is thought to be obvious that a cotton planter constructed in accordance with my invention is particularly well adapted for use by reason of the convenience and facility with which it may be assembled and operated and it will also be obvious that my invention is susceptible of some change and modification without materially departing from the appearance and spirit thereof and for this reason I do not wish to be understood as limiting myself to the precise arrangement and formation of the several parts herein shown in carrying out my invention in practice except as hereinafter claimed.

I claim:

1. In combination with a planter including a seed box and a spout co-acting therewith and a rotating feed member carried by the spout and extending within the box; a swinging valve co-acting with the discharge end of the spout, a substantially horizontally disposed arm pivotally engaged with the spout, a rod operatively engaged with the arm and with the valve, a retractile member co-acting with the arm for normally maintaining the valve in closed position, and a trip rotating with the feed member and intermittently contacting with the arm for throwing the valve into an open position.

2. In combination with a planter including a seed box and a spout co-acting therewith and a rotating feed member carried by the spout and extending within the box; a swinging valve co-acting with the discharge end of the spout, said valve being provided with a tail substantially in the form of an inverted V, a substantially horizontally disposed arm extending in a direction transverse of the swinging valve and having its outer end portion pivotally engaged with the spout, a rod operatively engaged with the inner end portion of the arm and the free end portion of the tail piece of the valve, a retractile member co-acting with the arm for normally maintaining the valve in closed position, and a trip rotating with the feed member and intermittently contacting with the arm for throwing the valve into an open position.

In testimony whereof I hereunto affix my signature in the presence of two witnesses.

ROBERT DUTCHER.

Witnesses:
 IVAN L. MILLER,
 HUBERT NUSH.